United States Patent  (10) Patent No.: US 8,418,066 B2
Choudhary et al. (45) Date of Patent: Apr. 9, 2013

(54) CONTENT PERSONALIZATION FOR WEB DISTRIBUTED CONTENT

(75) Inventors: Samar Choudhary, Morrisville, NC (US); Richard A. King, Cary, NC (US); Vijay Pandiarajan, Apex, NC (US); Niraj D. Patel, Apex, NC (US); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1280 days.

(21) Appl. No.: 12/187,668

(22) Filed: Aug. 7, 2008

(65) Prior Publication Data
US 2010/0036849 A1 Feb. 11, 2010

(51) Int. Cl.
*G06F 3/00* (2006.01)
*G06F 17/00* (2006.01)

(52) U.S. Cl.
USPC ............ 715/744; 715/733; 715/234; 715/249

(58) Field of Classification Search .................. 715/733, 715/735, 744, 746, 747, 760, 764, 765, 788, 715/866, 200, 221, 223, 234, 235, 236, 249
See application file for complete search history.

(56) References Cited

U.S. PATENT DOCUMENTS

| | | | | |
|---|---|---|---|---|
| 7,533,335 B1 * | 5/2009 | Sawicki et al. | ............... | 715/239 |
| 7,904,807 B2 * | 3/2011 | Bell et al. | ....................... | 715/249 |
| 7,908,551 B2 * | 3/2011 | Yao et al. | ....................... | 715/236 |
| 2001/0011364 A1 * | 8/2001 | Stoub | .................... | 717/1 |
| 2002/0026462 A1 * | 2/2002 | Shotton et al. | ................ | 707/523 |
| 2002/0152245 A1 * | 10/2002 | McCaskey et al. | ............ | 707/530 |
| 2004/0041818 A1 * | 3/2004 | White et al. | ................... | 345/619 |
| 2004/0075682 A1 * | 4/2004 | Burleson | ........................ | 345/738 |
| 2005/0204276 A1 * | 9/2005 | Hosea et al. | ................ | 715/501.1 |
| 2006/0287971 A1 * | 12/2006 | Armstrong | ........................ | 707/1 |
| 2008/0134077 A1 * | 6/2008 | Cheng et al. | ................... | 715/781 |
| 2009/0313550 A1 * | 12/2009 | Kim et al. | ...................... | 715/744 |

\* cited by examiner

*Primary Examiner* — Xiomar L Bautista
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to content formatting for Web distributed content and provide a method, system and computer program product for content personalization for Web distributed content. In an embodiment of the invention, a content customization method can be provided. The method can include selecting content in a retrieved page, retrieving an applied customization from a source separate from a source of the retrieved page, applying the applied customization to the selected content to modify a visual appearance of the selected content, and providing the selected content once modified for display in a content browser.

10 Claims, 1 Drawing Sheet

CONTENT PERSONALIZATION FOR WEB DISTRIBUTED CONTENT

BACKGROUND OF THE INVENTION

1. Field of the Invention

The present invention relates to the field of Web content customization and more particularly to providing a personalized view of Web content.

2. Description of the Related Art

The growth of the Internet largely can be attributed to the desire for remotely disposed individuals to share content. Long before the development of the hypertext transfer protocol (HTTP) and the World Wide Web, academics, bureaucrats and private individuals indexed and exchanged content over the Internet. The explosion of Internet use following the development of the World Wide Web, however, has resulted in a vast sea of content leading to creation by necessity of advanced content searching applications used almost universally by all users of the Internet today.

The presentation of content over the World Wide Web is limited to the creation time choices of the content designer. In this regard, the presentation of content can range from no formatting at all, to the complex arrangement of different content elements in a page. User interface controls further can be embedded within a page as script logic in order to enhance the presentation of content. Exemplary user interface controls include scroll bars, sortable tables and the like. Even still, the consumer of content over the World Wide Web is limited to the nature and selection of user interface controls provided by the content creator at design time.

Portal technologies provide some flexibility to the content consumer in arranging the presentation of content to satisfy personal preferences. In particular, in the portal context, end users can select different content modules, referred to as portlets, to be aggregated in a single view. By providing a customized viewing of content, end users can enjoy a highly personalized experience in an efficient manner by consolidating a substantial amount of desired content in a single view. Further, syndicated feeds allow end users to pick and choose content elements from different content sites to be aggregated in a single portal view. Notwithstanding, the presentation of content in a portal view still is exclusively dependent on the content creator who determines how the content of a portlet is to be presented to the end user.

In this regard, different end users prefer to view content in different formats and in different ways. For example, data presented in tabular format may be preferred to be viewed in a particular sort order by different end users. Similarly, data presented in tabular format may be preferred to be viewed in graphical format such as in a chart or graph. As yet another example, different end users may prefer to view content in a language other than the language of the content provided by the content creator. Regardless, however, end users are compelled to view content in exactly the same format as provided by the content creator.

BRIEF SUMMARY OF THE INVENTION

Embodiments of the present invention address deficiencies of the art in respect to content formatting for Web distributed content and provide a novel and non-obvious method, system and computer program product for content personalization for Web distributed content. In an embodiment of the invention, a content customization method can be provided. The method can include selecting content in a retrieved page, retrieving an applied customization from a source separate from a source of the retrieved page, applying the applied customization to the selected content to modify a visual appearance of the selected content, and providing the selected content once modified for display in a content browser. In this regard, by changing visual appearance it is meant that the presentation of selected content can vary including font, color, arrangement, format, and even unit type. In the latter instance, data in the content can be transformed from values associated with one type of unit to values associated with a different type of unit.

Optionally, the method also can include generating a bookmark referencing both the selected content and the retrieved applied customization, and storing the bookmark for subsequent retrieval. Consequently, the bookmark subsequently can be retrieved and the selected content and the applied customization referenced in the bookmark can be loaded. Thereafter, the applied customization can be applied to the selected content to again modify a visual appearance of the selected content. Finally, the selected content can be provided once again as modified for display in the content browser. Additionally, the bookmark can be shared with other end users.

In another embodiment of the invention, a content distribution system can be provided. The system can include a content browser, and content customization logic. The logic can include program code enabled to select content in a retrieved page, retrieve an applied customization from a source separate from a source of the retrieved page, apply the applied customization to the selected content to modify a visual appearance of the selected content, and provide the selected content once modified for display in the content browser. The system also can include a bookmark server communicatively coupled to the content browser. The bookmark server can include a bookmark data store of bookmarks, each including a reference to both selected content in a page retrievable from one source over a computer communications network, and also an applied customization to be applied to the selected content, the applied customization being retrievable from a different source over the computer communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for content personalization of Web distributed content. In accordance with an embodiment of the present invention, a content formatting script can be selected and applied to content loaded for viewing in a Web page retrieved from a Web server. The content formatting script, when applied to the content loaded for viewing in the Web page can change the presentation of the content after the content has been provided for viewing in the Web page by the Web server. Optionally, the content formatting script can be persisted in association with a uniform resource locator (URL) for the Web page as a bookmark. Further, the bookmark can be shared with other end users so as to apply the content formatting script to the content of the Web page when the Web page is loaded by the other end users.

Figure 1:
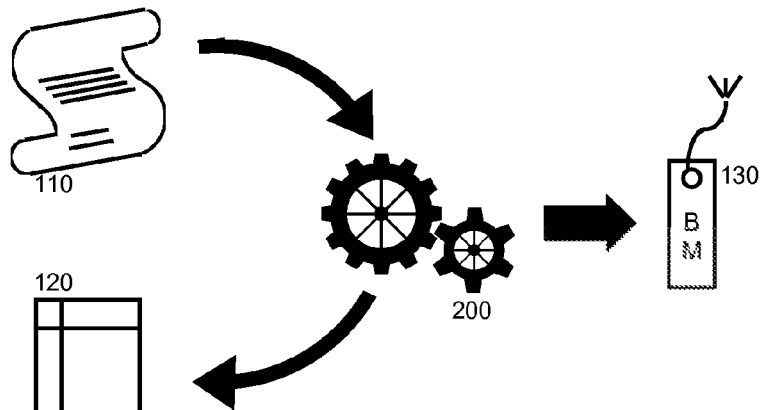
FIG. 1 is a pictorial illustration of a process for content personalization of Web distributed content.

In further illustration, FIG. 1 pictorial shows a process for content personalization of Web distributed content. As shown in FIG. 1, content personalization data processing system 200 can format content 110 retrieved from a content source according to applied customization 120. Specifically, content 110 selected within a page can be formatted with applied customization 120 which can be in the form of a script or style sheet both separately disposed from the page with the content 110. By way of example, the applied customization 120 can include a script providing table sorting, a table filtering, auto form fill, or advertisement image suppression. Alternatively, the applied customization 120 can include a style sheet defining formatting such as background, color, font size, font type and the like.

Optionally, the content 110 once formatted according to the applied customization 120, can be persisted in the form of a bookmark 130. In this way, the retrieval of the bookmark 130 can result in the retrieval of the content 110 along with the application of the applied customization 120. Yet further, the bookmark 130 can be stored in a remote repository (not shown) such that the bookmark 130 can be retrieved for use irrespective of the computer used to retrieve the bookmark 130. Even yet further, when stored in the remote repository (not shown), the bookmark 130 can be retrieved by other persons subject to the permissions set for the bookmark 130. In this way, the visual benefit of the applied customization 120 applied to the content 110 can be enjoyed through re-use by multiple different users.

Figure 2:
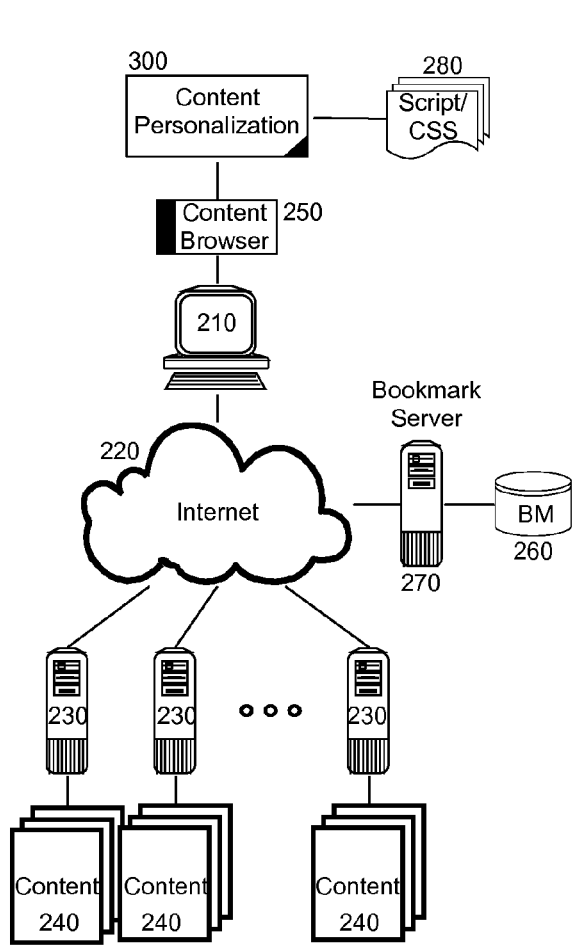
FIG. 2 is a schematic illustration of a content distribution data processing system configured for content personalization of Web distributed content; and, FIG. 3 is a flow chart illustrating a process for content personalization of Web distributed content.

The content personalization shown in FIG. 1 can embodied within a content distribution data processing system. In illustration, FIG. 2 schematically depicts a content distribution data processing system configured for content personalization of Web distributed content. The system can include a host computing system 210 configured for communicative coupling to multiple different servers 230 over computer communications network 220, for example the global Internet. Each of the servers 230 can serve content 240 over the network 220 to the host computing system 210 for rendering in a content browser 250 executing in the host computing system 210.

Notably, content customization logic 300 can be coupled to the content browser 250. The content customization logic 300 can include program code enabled to apply a selected applied customization 280 to selected content 240. Specifically, the program code can be enabled to retrieve markup for the content 240 and to modify the markup with a selected applied customization 280, such as a script configured to format the selected content 240, or a style sheet defined to modify the appearance of the selected content 240.

Optionally, the content customization logic 300 can include additional program code enabled to formulate a bookmark to the selected content 240 and also the applied customization 280. The bookmark can be stored in a bookmark data store 260 managed by bookmark server 270 and the bookmark server 270 can be configured to be accessible over the computer communications network 220. In this way, stored bookmarks can be retrieved for re-use irrespective of the computing platform used to retrieve the bookmarks. Furthermore, subject to requisite permissions, different bookmarks stored by different end users in the bookmark data store 260 can be shared by others so as to not require each individual end user to separately apply the same applied customization 280 to the same selected content 240 in order to produce the same formatted form of the same selected content 240.

Figure 3:
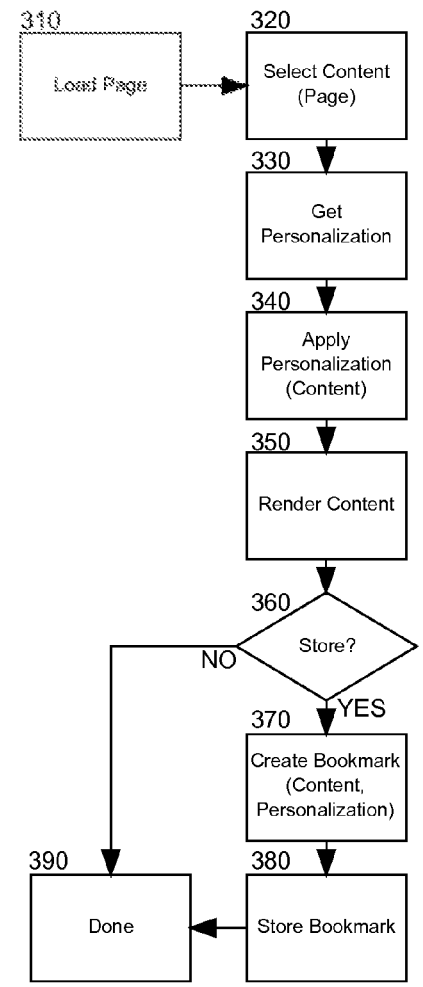

In even yet further illustration of the operation of the content customization logic 300, FIG. 3 is a flow chart illustrating a process for content personalization of Web distributed content. Beginning in block 310, a page can be retrieved from a page server and in block 320 content within the page can be selected for applied customization. In block 330, an applied customization can be selected for application to the selected content and in block 340 the applied customization can be applied to the selected content. Finally, in block 350 the formatted content can be rendered for viewing.

In decision block 360, it can be determined whether or not to store a reference to the formatted content for subsequent retrieval. If so, in block 370 a bookmark can be created referencing the selected content as formatted by the applied customization. Specifically, the selected content within the page can be included in the bookmark along with a reference to the applied customization so that when invoking the bookmark, the referenced applied customization can be applied dynamically to the selected content. In any case, once created the bookmark can be stored for subsequent retrieval in block 380. Finally, the process can end in block 390.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A content customization method comprising:
selecting content in a retrieved page;
retrieving an applied customization from a source separate from a source of the retrieved page;
applying the applied customization to the selected content to modify a visual appearance of the selected content;
providing the selected content once modified for display in a content browser;
generating a bookmark referencing both the modified selected content and the retrieved applied customization;
storing the bookmark for subsequent retrieval; and
sharing the bookmark with other end users.

2. The method of claim 1, further comprising:
retrieving the bookmark;
loading the selected content and the applied customization referenced in the bookmark;
re-applying the applied customization to the selected content to again modify a visual appearance of the selected content; and,
providing the selected content once again modified for display in the content browser.

3. A content distribution system comprising:
a content browser;
content customization logic comprising program code enabled to select content in a retrieved page, retrieve an applied customization from a source separate from a source of the retrieved page, apply the applied customization to the selected content to modify a visual appearance of the selected content, and provide the selected content once modified for display in the content browser; and
a bookmark server communicatively coupled to the content browser, the bookmark server comprising a bookmark data store of bookmarks, each of the bookmarks comprising a reference to both modified selected content in a page retrievable from one source over a computer communications network, and also an applied customization to be applied to the select content, the applied customization being retrievable from a different source over the computer communications network, wherein the bookmarks are shared amongst end users.

4. The system of claim 3, wherein the applied customization is a script sorting the selected content in a table.

5. The system of claim 3, wherein the applied customization is a script filtering the selected content in a table.

6. The system of claim 3, wherein the applied customization is a script providing auto form filling for the selected content.

7. The system of claim 3, wherein the applied customization is a script suppressing advertisements in the selected content.

8. The system of claim 3, wherein the applied customization is a style sheet modifying a visual appearance of the selected content.

9. A computer program product comprising a computer usable storage medium storing computer usable program code for content customization, the computer program product comprising:
computer usable program code for selecting content in a retrieved page;
computer usable program code for retrieving an applied customization from a source separate from a source of the retrieved page;
computer usable program code for applying the applied customization to the selected content to modify a visual appearance of the selected content;
computer usable program code for providing the selected content once modified for display in a content browser;
computer usable program code for generating a bookmark referencing both the modified selected content and the retrieved applied customization;
computer usable program code for storing the bookmark for subsequent retrieval; and
computer usable program code for sharing the bookmark with other end users.

10. The computer program product of claim 9, further comprising:
computer usable program code for retrieving the bookmark;
computer usable program code for loading the selected content and the applied customization referenced in the bookmark;
computer usable program code for re-applying the applied customization to the selected content to again modify a visual appearance of the selected content; and,
computer usable program code for providing the selected content once again modified for display in the content browser.

* * * * *